US010686170B2

(12) United States Patent
Kritzer et al.

(10) Patent No.: US 10,686,170 B2
(45) Date of Patent: Jun. 16, 2020

(54) RECEIVING ELEMENT FOR POUCH CELLS

(71) Applicant: Carl Freudenberg KG, Weinheim (DE)

(72) Inventors: Peter Kritzer, Forst (DE); Olaf Nahrwold, Ludwigshafen (DE); Mark Boggasch, Laudenbach (DE); Ulla Pressler, Hemsbach (DE)

(73) Assignee: CARL FREUDENBERG KG, Weinheim (DE)

( * ) Notice: Subject to any disclaimer, the term of this patent is extended or adjusted under 35 U.S.C. 154(b) by 299 days.

(21) Appl. No.: 15/210,899

(22) Filed: Jul. 15, 2016

(65) Prior Publication Data
US 2017/0018746 A1 Jan. 19, 2017

(30) Foreign Application Priority Data
Jul. 15, 2015 (EP) .................................... 15176896

(51) Int. Cl.
| H01M 2/10 | (2006.01) |
| H01M 2/06 | (2006.01) |
| H01M 2/02 | (2006.01) |
| B29C 48/12 | (2019.01) |
| H01M 2/16 | (2006.01) |
| H01M 2/18 | (2006.01) |
| B29C 48/00 | (2019.01) |
| B29K 101/12 | (2006.01) |
| B29K 105/04 | (2006.01) |
| B29C 48/03 | (2019.01) |
| B29L 31/00 | (2006.01) |

(52) U.S. Cl.
CPC ....... *H01M 2/1022* (2013.01); *B29C 48/0012* (2019.02); *B29C 48/12* (2019.02); *H01M 2/0212* (2013.01); *H01M 2/06* (2013.01); *H01M 2/1061* (2013.01); *H01M 2/1077* (2013.01); *H01M 2/1653* (2013.01); *H01M 2/18* (2013.01); *B29C 48/03* (2019.02); *B29K 2101/12* (2013.01); *B29K 2105/046* (2013.01); *B29L 2031/7146* (2013.01); *H01M 2/0275* (2013.01); *H01M 2200/00* (2013.01)

(58) Field of Classification Search
CPC ..... H01M 2/1022; H01M 2/0212; H01M 2/06
See application file for complete search history.

(56) References Cited

U.S. PATENT DOCUMENTS

2007/0207377 A1* 9/2007 Han ...................... H01M 2/021
429/162
2011/0008665 A1 1/2011 Yoon et al.

FOREIGN PATENT DOCUMENTS

| EP | 2597698 | * | 5/2013 | ............ H01M 10/50 2/2 |
| EP | 2597698 A1 | | 5/2013 | |
| JP | 2005-123128 | * | 5/2005 | .............. H01M 2/10 2/2 |
| JP | 2012221730 A | | 11/2012 | |
| JP | 2014093239 A | | 5/2014 | |

(Continued)

Primary Examiner — Osei K Amponsah
(74) Attorney, Agent, or Firm — Leydig, Voit & Mayer, Ltd.

(57) ABSTRACT

A receiving element for mounting pouch cells, has a base body, wherein, with respect to an object of receiving pouch cells securely and cost-effectively in a frame or housing, the base body is formed as a profile having a contact surface for contact against a sealing seam of a pouch cell.

7 Claims, 22 Drawing Sheets

(56) References Cited

FOREIGN PATENT DOCUMENTS

| KR | 20070025391 A | | 3/2007 | |
|----|---------------|---|--------|---|
| WO | WO 2013079080 | * | 6/2013 | .......... H01M 2/0207 |
| WO | WO 2013079080 A1 | | 6/2013 | |
| WO | WO 2014003357 | * | 1/2014 | .............. H01M 2/12 |
| WO | WO 2014003357 A1 | | 1/2014 | |

* cited by examiner

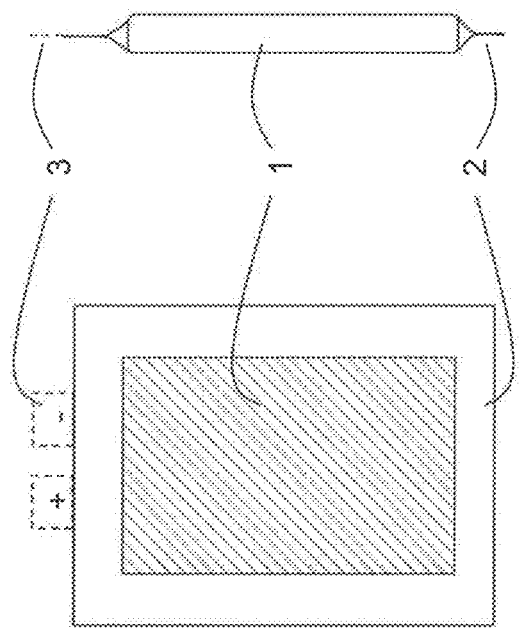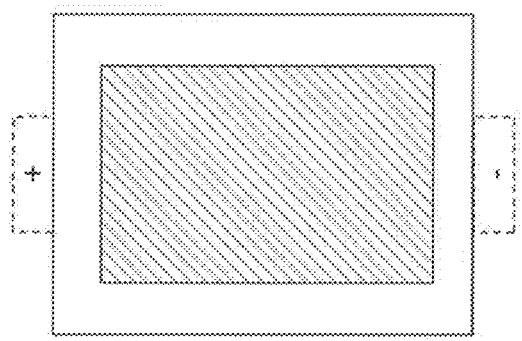
Fig. 1

RECEIVING ELEMENT FOR POUCH CELLS

CROSS-REFERENCE TO RELATED APPLICATIONS

Priority is claimed to European Patent Application No. 15,176,896.7, filed on Jul. 15, 2015, the entire disclosure of which is hereby incorporated by reference herein.

FIELD

The invention relates to a receiving element for pouch cells.

BACKGROUND

Large battery systems, which are based for example on lithium technology, for example lithium ions, lithium polymer, lithium sulfur, are used in various applications. Usually, a battery system comprises 50 to 200 cells. In large energy stores, several thousand cells is also usual.

Typically, 6 to 12 cells are used for each module, the number of cells generally being limited by a module voltage of 50 V. Above 50 V, the modules are deemed to be high-voltage components.

The cells may be present in various configurations, specifically as round cells having a solid metal housing, as prismatic cells having a solid metal housing, or as pouch cells having a flexible foil housing.

Pouch cells have major advantages over cell forms having solid housings.

The energy density or power density is higher, because the housing weighs less.

The manufacturing costs are much lower, since the housing is cheaper.

The assembly of an electrode/separator stack in the housing can be integrated into a lamination manufacturing process.

The cell size can be changed in a simple manner, since larger or thicker cells do not require a new cell housing. Cell manufacturers can thus react rapidly to consumer requirements.

Pouch cells promote future trends in active material developments. For example, anode materials based on a non-graphite substrate have a much higher volume work in cyclization, leading to a higher expansion in thickness of the cell housing. This swelling can only be tolerated to a limited extent by solid housings. Further, the pouch cell design is also applicable to future cell chemistry designs, for example alkali metal sulfur designs.

However, the following technical drawbacks present an obstacle. Mounting the flexible cells in a module housing or system housing is complex. The cell thickness changes during charging. In the event of a fault, the location of the cell opening is not predictable.

The following table compares the types of cells.

|  | Round cell | Prismatic cell | Pouch cell |
| --- | --- | --- | --- |
| System: | wound electrodes and separator metal housing | stacked electrodes and separator metal housing | stacked or wound electrodes and separator foil housing |
| Technical advantages | Cooling is effective Fixed electrodes Stable housing | No dead volume between cells Fixed electrodes Stable housing | No dead volume between cells Scalability Cooling in the |
| Technical challenges | Mechanically robust Heavy Cooling in the cell is ineffective Limited scalability Dead volume between cells | Mechanically robust Cooling in the cell is effective Heavy Rapid gas discharge in the event of a fault Limited scalability | cell is effective Lightweight Lower production costs Mounting in housing Cell thickness changes during charging Location of cell opening not predictable in the event of a fault |

Pouch cells for the aforementioned applications have the following typical dimensions. The surface area is approximately $100 \times 100$ mm$^2$ to $300 \times 400$ mm$^2$. The thickness is approximately 8-15 mm. An increased cell size may for example bring about an increased cell capacity, for example for energy batteries, or else an increased cell power (in power batteries). Changing the active material may also necessitate adaptation of the cell dimensions. For the same system parameters and when using an active material having a lower energy density, thicker cells may be required.

Fixing and/or mounting pouch cells in a housing is already disclosed in the prior art. Substantial drawbacks of the previous fixing designs are as follows. The cells are embedded in a fairly complex frame. A new cell size therefore requires a completely new frame. This in turn generally involves high investments, for example for new tools if plastics frames or polymer frames are used. This means it is not possible to effectively take advantage of one of the major advantages; the possibility of rapid and cost-effective scalability of the cell size.

Further, the manufacturing processes for frames are slow by comparison with those for cells. Accordingly, either the frame production process is the bottleneck of battery system production, or the frames have to be made in a plurality of parallel systems or tools. This again requires high investments.

SUMMARY

An aspect of the invention provides a receiving element for mounting one or more pouch cells, the receiving element comprising: a base body, wherein the base body is configured as a profile including a contact surface configured to contact against a sealing seam of a pouch cell.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 provides schematic views of pouch cells;

FIG. 3a is a partial view of the stack according to FIG. 2, the recess which encloses the sealing seam additionally being flanked on one or both sides in the profile by longitudinal nubs in order to achieve targeted compression on the sealing seam, merely the two primary sides of a pouch cell being enclosed by the profile so as to make particularly simple mounting of the stack possible;

FIG. 3b is a sectional view of the profile according to FIG. 3a;

DETAILED DESCRIPTION

Figure 2:
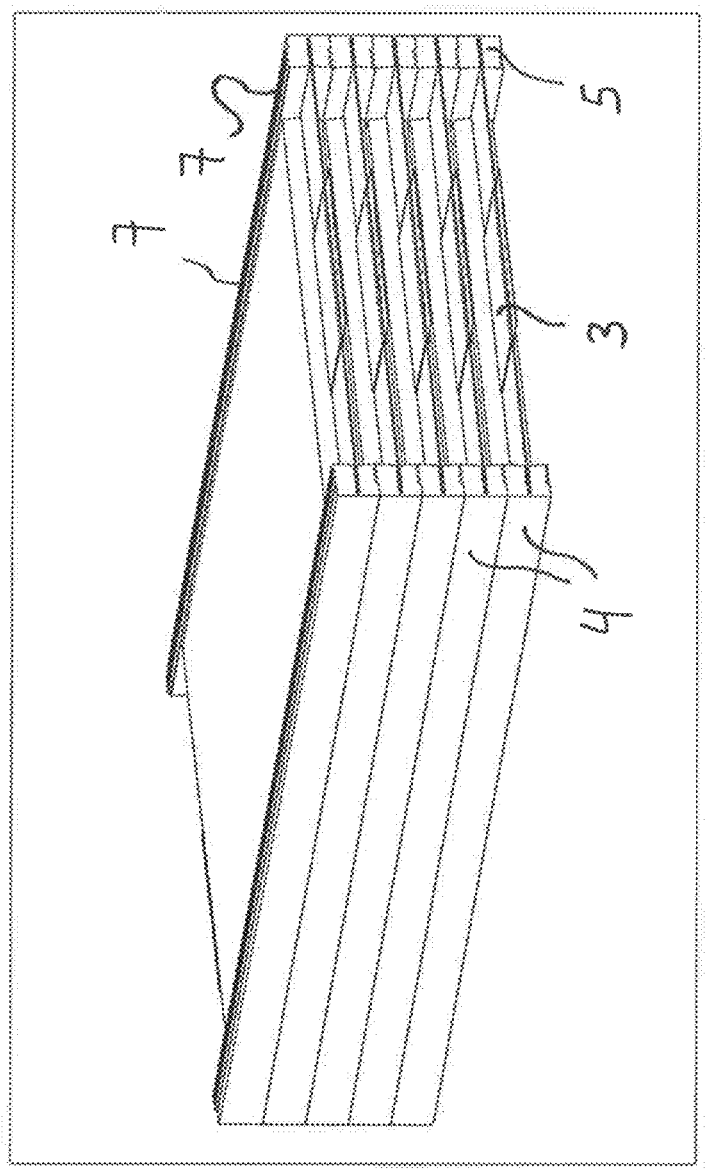
FIG. 2 shows a stack comprising a plurality of pouch cells, the sealing seam of each cell being inserted in a recess of a profile, and adjacent profiles engaging in one another and thus making it possible to mount a stack having in this case five cells.

An object of the invention is therefore to receive pouch cells securely and cost-effectively in a frame or housing.

According to an aspect of the invention, a receiver design for pouch cells is disclosed which has the following basic advantages. The basic receiving element has an extruded profile made of elastomer, thermoplastic elastomer, or a material which consists of the aforementioned elastomers at least in part. The profile according to the invention is placed on and/or around the sealing seam of the pouch cell. Thus, the sealing seam enters either a recess in an individual profile or a recess between two adjacent profiles. The sealing seam is resiliently compressed by compression. The length and/or width expansion of the pouch cell can be compensated by simply cutting the profiles to length. The use of profiles results in the following major advantages. There are no high tool costs for extruded profiles. The profiles can be adapted to the length and/or width of the pouch cells in a simple manner. For pouch cells of different sizes, perfectly fitting receiving elements can be created by cutting the profiles to length, without the need to invest in new tools.

In the present design, in principle new tools are needed whenever new pouch cells of a different thickness are to be mounted. In general, the thickness differences between two cell variants are not great, and so a profile for a 12 mm thick pouch cell can readily be used for a 10 mm thick pouch cell. A tool for profiles for thick pouch cells can in principle be converted in such a way that profiles for thinner pouch cells can also be created.

An object mentioned at the outset is therefore achieved.

It could be possible to manufacture the profile using a continuous extrusion method. As a result, the profile is formed as a strand and is easy to process.

The profile could be made of an elastomer, a thermoplastic elastomer or a closed-pore foam at least in part or comprise these materials. Since electrolyte resistance should be irrelevant in most cases, in principle any elastomer material, in particular NBR, may be used. Extruded, closed-pore foams are also conceivable. However, in this context it should be noted that materials of this type generally have worse mechanical properties, in particular a lower ability to recover, than elastomers.

Embedding suitable conventional filler materials can contribute to meeting fire protection requirements. For thermally demanding applications, a silicone elastomer is an alternative. These materials are in addition also flame-proof. Since the temperatures to which the profiles are exposed generally do not exceed a sustained temperature of approximately 60° C. or a peak temperature of 85° C., thermoplastic elastomers (TPEs) may also be resorted to. However, in this case care should be taken that the mechanical compression is not set too strong and thus the profile does not set during the service life of the battery. Thermoplastic elastomers are thus primarily a cost-effective alternative to elastomers.

The use of hollow-body filler materials, for example hollow glass beads or aerogels, makes possible a particularly weight-optimized configuration of the profiles. Products of this type are particularly beneficial for mobile applications, in particular for air travel or automobile applications. These hollow bodies additionally lead to thermal insulation, which may be advantageous for particular applications, for example for backup battery systems for stationary batteries in regions having a cold climate. The process heat of the battery, which is not dissipated, prevents strong cooling thereof.

By contrast, if the profiles are intended to contribute to cooling of the cells, thermally conductive filler materials may be used. As long as the profiles do not come into contact with current-carrying parts, in particular with the terminal bushings, conventional carbon-based or metal-based filler materials are advantageous. By contrast, if the profiles do come into contact with current-carrying parts, in particular with terminal bushings, the profiles have to be electrically insulating. In this case, mineral filler materials such as boron nitride, aluminum oxide or aluminum hydroxide can increase the thermal conductivity of the elastomers.

The profile could be made exclusively of an elastomer or a thermoplastic elastomer. The material from which the profile is made may consist completely of elastomer. EPDM is a cost-effective material which is resistant to electrolytes which escape in the event of damage.

The profile could be made of two materials, a second material being harder than a first material. At least one of the materials could be an elastomer or a thermoplastic elastomer. The harder material could be a thermoplastics or a metal and act as a clamp, contact pressure element or end stop element.

The profile could comprise a recess for receiving a sealing seam of a pouch cell. The recess may be formed in the manner of a slit, in such a way that a single profile can receive a sealing seam. Against this background, it is conceivable for a cavity arranged in the longitudinal direction to be incorporated in the profile.

The profile could be formed in the manner of a comb, specifically having a plurality of recesses for receiving sealing seams of a plurality of pouch cells.

An arrangement could comprise at least two receiving elements of the type described herein and at least one pouch cell, the sealing seam of the pouch cell being placed in a profile or between two adjacent profiles.

The profiles could compress the sealing seam of the cell resiliently at least on one side. This provides sealing.

The profiles could compress the sealing seam of the cell resiliently on both sides. This makes gentle compression possible.

The receiving elements could enclose at least two sides of a pouch cell. These sides are preferably free of current diverters.

The receiving elements could enclose three or four sides of a pouch cell. If embedding elements are located on three sides, rapid and simple mounting is possible. A pouch cell comprising current diverters positioned on one side can advantageously be embedded in this manner. In this case, the embedding elements are located on the three remaining sides.

Regions of current diverters could also be compressed by the profile. This stabilizes a current diverter.

A region of the sealing seam which is not positioned directly adjacently to the current diverters might not be compressed by the profile, so as to form this region as a predetermined breaking point in the event of an internal overpressure.

The profiles could, as parts of a stack, press against sealing seams on both sides, this arrangement being placed in a housing so as to have a positive fit at least in part and the housing taking on the function of compressing the stack.

Further technical advantages of sealing by means of profiles which enclose the sealing seam of a pouch cell are described in the following.

A critical point in a sealing seam is the permeation along the sealing seam. Firstly, electrolytes may permeate from the inside to the outside. However, by comparison, the permeation of in particular oxygen and water from the outside to the inside is more critical. Both lead to accelerated aging of the pouch cells. Accordingly, for pouch cells configured for long service lives, a longer or wider sealing seam is technically expedient. A profile which presses on the sealing seam from the outside or encloses the sealing seam greatly reduces the permeation of water. Accordingly, pouch cells sealed by profiles of this type are subject to reduced aging for the same sealing seam width. Alternatively, as a result of the sealing by means of profiles, the sealing seam width can be made smaller. Accordingly, space can thus be saved without having to make compromises in relation to aging.

A receiving element may have any profile which is shown in cross section in the drawings.

A battery module or a battery system could contain pouch cells which are fixed to the receiving elements described herein. The battery module or battery system could contain an arrangement of the type described herein.

FIG. 1 is a schematic view of a pouch cell, specifically a galvanic cell having a flexible casing, consisting of the actual cell body 1 in which electrode separator layers are located, a peripheral sealing seam 2 in the region of which the upper and lower cover foils are welded together, and current diverters 3 which project out of the cell between the cover foils and which are additionally sealed off using a foil. The current diverters 3 may project out from a housing on the same side or else be positioned on different sides.

During the operation of the cell, specifically during charging and/or discharging, the thickness of the cell body 1 changes by typically 5-10% between the charged and discharged states. In addition, an aged cell is approximately 5% thicker than a new cell. Accordingly, an aged, charged cell is approximately 10-15% thicker than a new, uncharged cell.

Particularly new anode materials, for example silicon-based materials, which make a higher percentage lithium storage capacity possible than a currently used graphite substrate, experience an even higher volume work. In new anode materials which make higher-capacity cells possible, the volume work of the cells is becoming increasingly relevant.

FIG. 2 shows a receiving element 4 for mounting pouch cells and comprising a base body 5, the base body 5 being formed as a profile having a contact surface 5a for contact against the sealing seam 2. The profile can be manufactured using a continuous extrusion method. The profile is made of an elastomer.

Figure 3:
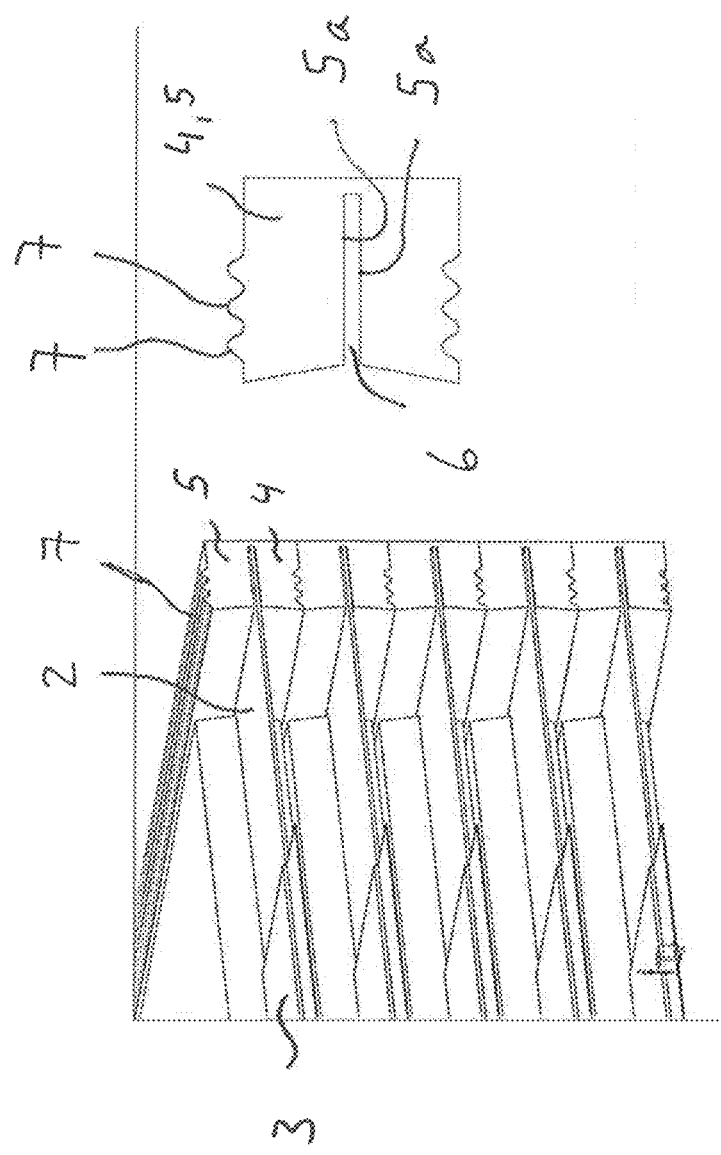

FIGS. 3a and 3b show that the profile according to FIG. 2 comprises a recess 6 for receiving a sealing seam 2 of a pouch cell. The recess 6 comprises two opposing contact surfaces 5a.

FIG. 2 thus shows an arrangement, specifically a stack, comprising at least two receiving elements 4 and at least one pouch cell, the sealing seam 2 of the pouch cell being placed in a profile. The profiles compress the sealing seam 2 of the pouch cell on both sides. The receiving elements 4 enclose at least two sides of a pouch cell.

The profile is provided with a sealing lip structure 7 which comprises a plurality of parallel sealing lips.

There is a defined gap between the pouch cells in order to compensate a change in thickness during charging and over the service life or to achieve cooling by way of an airflow or draft between the pouch cells.

Alternatively, the gap may be equipped with compressible elements, in particular with foams or non-woven fabrics. These may act as heat-transferring components. Alternatively, fireproof materials are also conceivable, in particular fireblocker non-woven fabrics. These may prevent or reduce the occurrence and in particular the spread of fires within the stack.

Cooling can additionally take place by way of contact cooling at the current diverters or by way of lateral contact cooling of the profiles.

Figure 4:
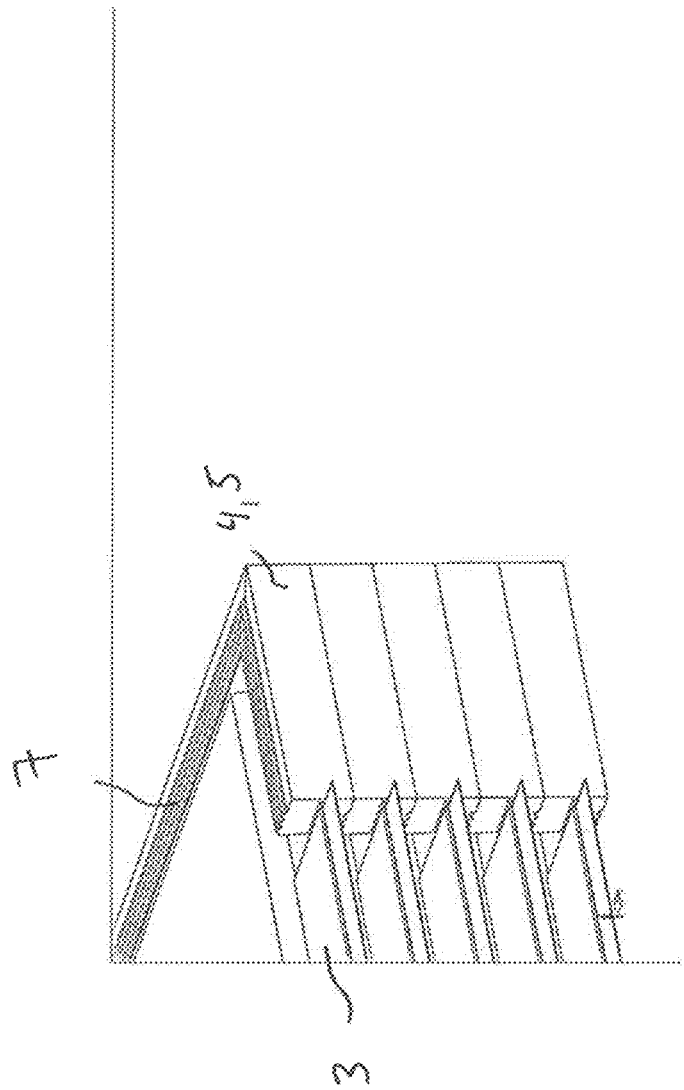
FIG. 4 is a partial view of a stack, the sealing seam of each pouch cell being inserted in a recess of a profile, the profile being stretched around the corner and not being present in the region of the current diverter.

FIG. 4 shows an arrangement in which a profile is guided around a corner and leaves space for the current diverter 3.

Figure 5:
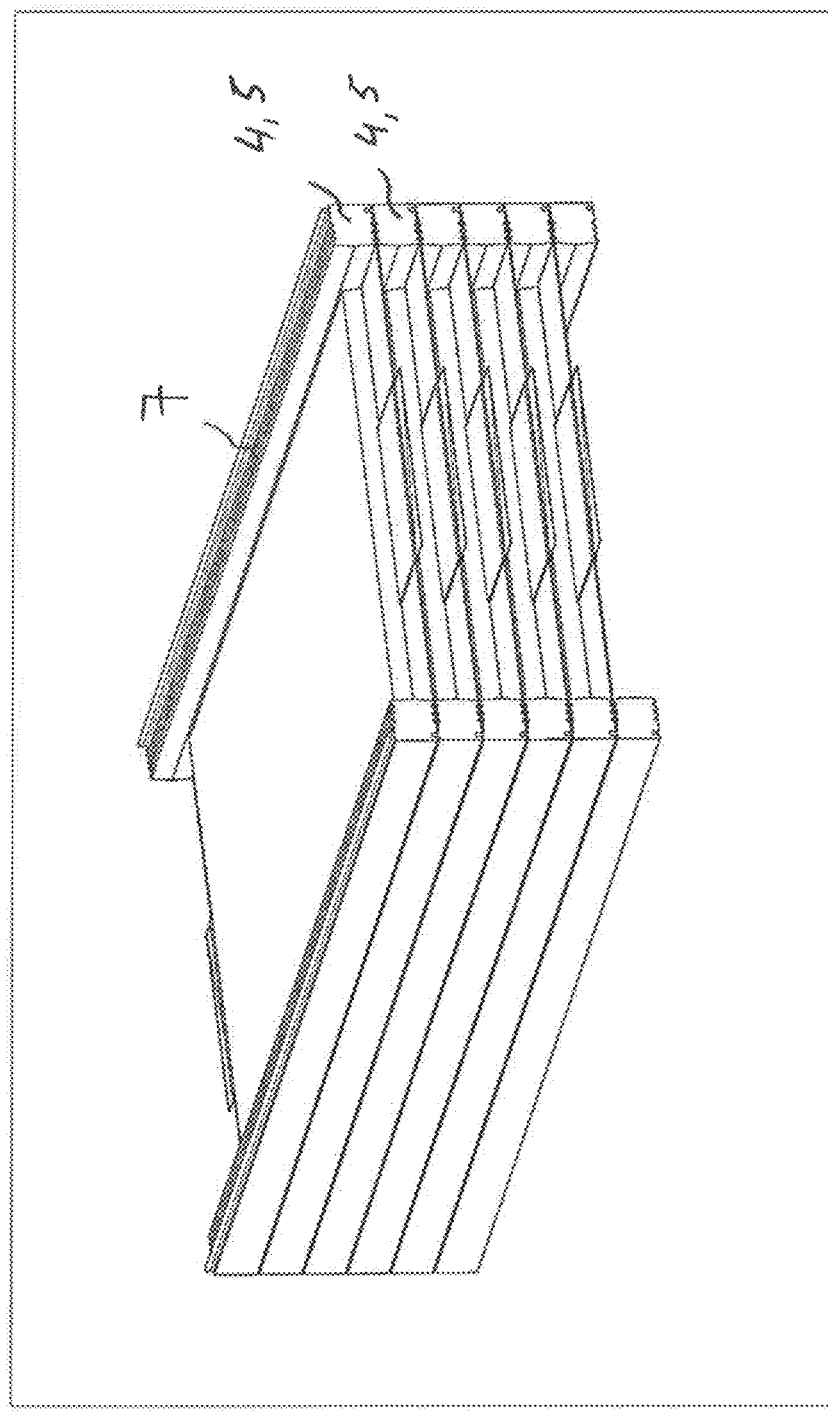
FIG. 5 shows a stack comprising a plurality of pouch cells, the sealing seam of each pouch cell being placed between two adjacent profiles, adjacent profiles engaging in one another by way of claw mechanisms and it thus being possible to mount a stack consisting in this case of five cells, merely the two primary sides of a pouch cell being enclosed by the profile in the case shown so as to make particularly simple mounting of the stack possible, and it additionally being possible to achieve cooling by way of an airflow between the cells.

FIG. 5 shows an arrangement comprising at least two receiving elements 4 and at least one pouch cell, the sealing seam 2 of the pouch cell being placed between two adjacent profiles.

FIGS. 4 and 5 show arrangements in which busbars, which make it possible to connect the individual pouch cells in series, can be attached to the profile by subsequently introducing or applying screws or threads to the elastomer profile.

Figure 6:
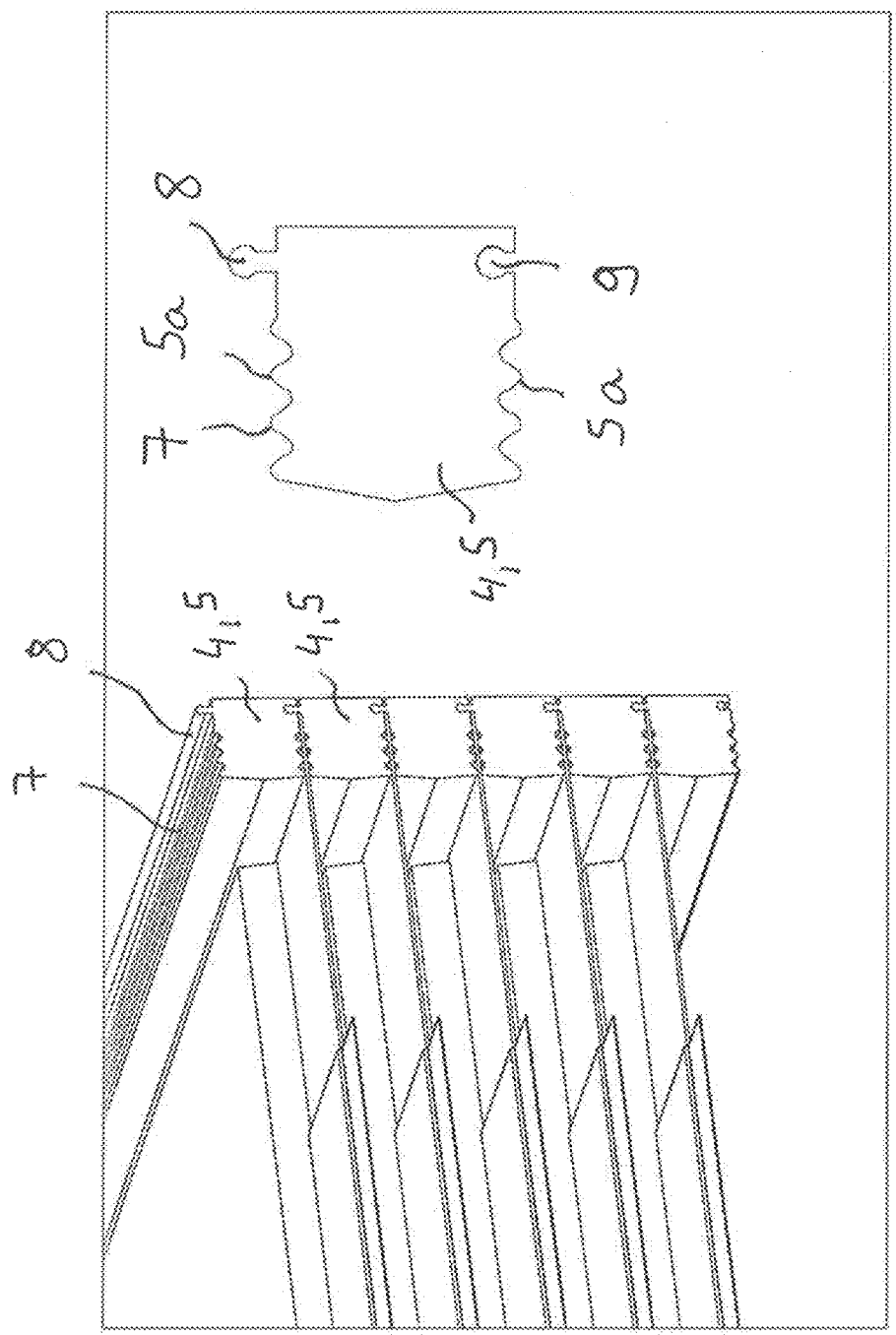
FIG. 6a is a partial view of the stack according to FIG. 5, it being possible to set a defined distance or gap between the cells.
FIG. 6b is a sectional view of the profile according to FIG. 5, the profile having a multi-lip sealing lip design.

FIGS. 6a and 6b are detail views of the profile according to FIG. 5. The profile is provided with a sealing lip structure 7 which comprises a plurality of parallel sealing lips. The profile further comprises a claw element 8 and a claw element receiver 9. The claw element 8 can engage positively in a claw element receiver 9 of another profile in order to form a stack.

Figure 7:
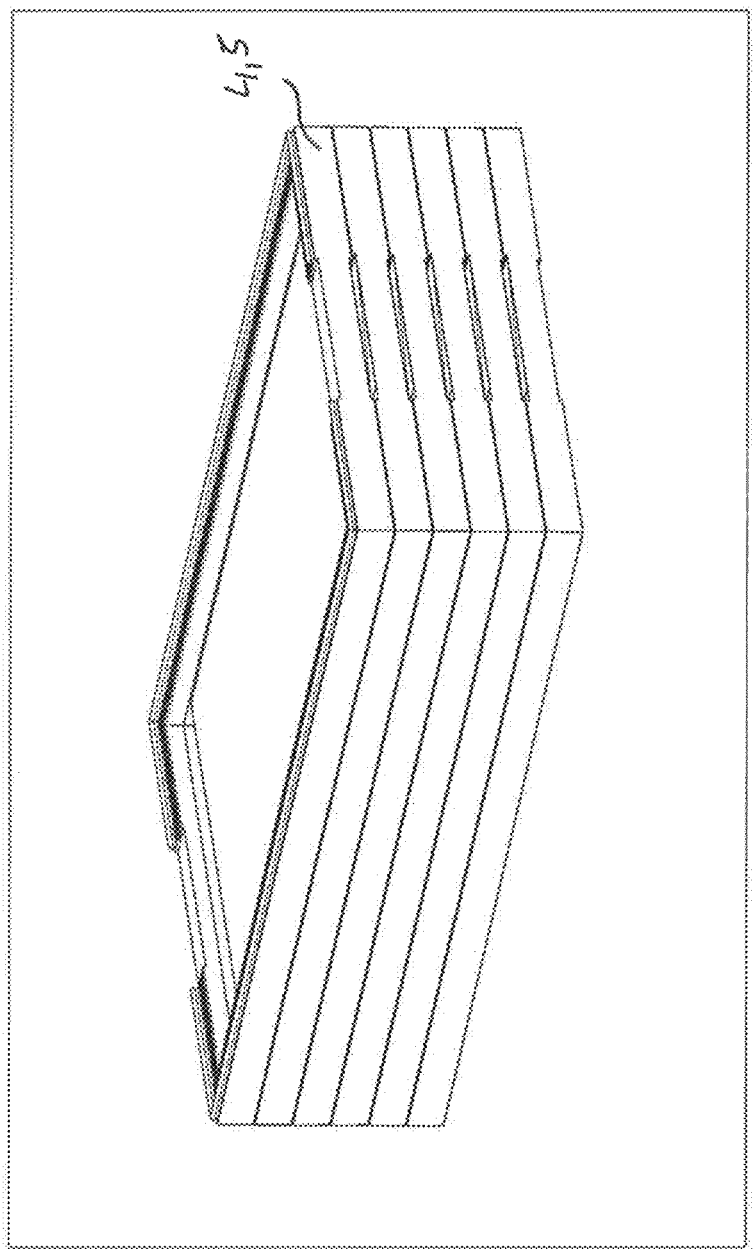
FIG. 7 shows a stack comprising a plurality of pouch cells, the sealing seam of each pouch cell being inserted between two adjacent profiles, adjacent profiles engaging in one another by way of claw mechanisms and it thus being possible to mount a stack consisting in this case of five cells, the profiles leading around a pouch cell and compression of the sealing seam in the region of the current diverter thus also being ensured.

FIG. 7 shows an arrangement in which the receiving elements 4 enclose three sides of a pouch cell.

In this arrangement too, busbars, which make it possible to connect the individual pouch cells in series, can be attached to the profile by subsequently introducing or applying screws or threads to the elastomer profile.

Figure 8:
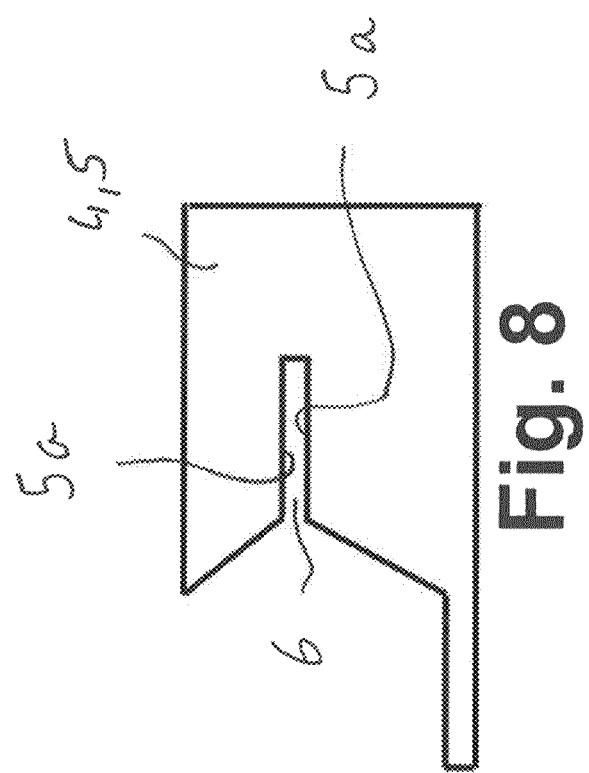
FIG. 8 is a sectional view of a profile, a recess being provided which receives the sealing seam of a pouch cell, the pouch cell being able to rest at least in part on a support face integrated into the profile.

FIG. 8 is a sectional view of a profile which is particularly preferably used in a horizontal stack structure. Said profile makes simple mounting possible and has good resistance to shocks or vibrations.

Figure 9:
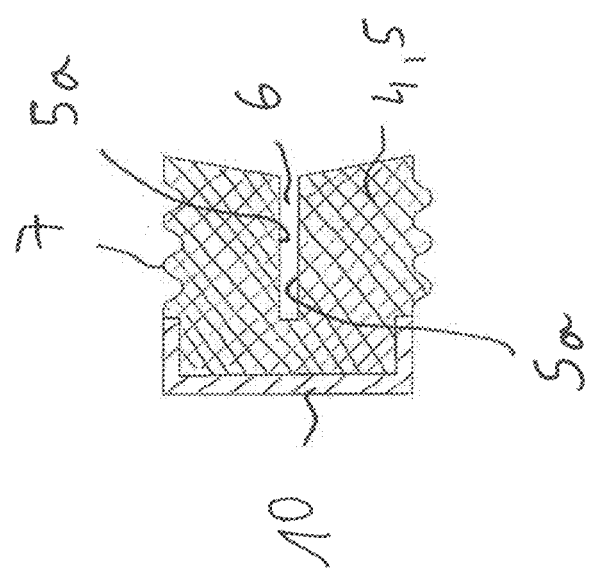
FIG. 9 is a sectional view of a profile having a rigid back, which may consist of metal, a thermoplastics, or a second elastomer, the profile making good stacking possible and also being able to be used as part of a housing.

FIG. 9 shows a profile made of two materials, a second material being harder than a first material. The profile has a rigid back 10 which is made of the second material.

Figure 10:
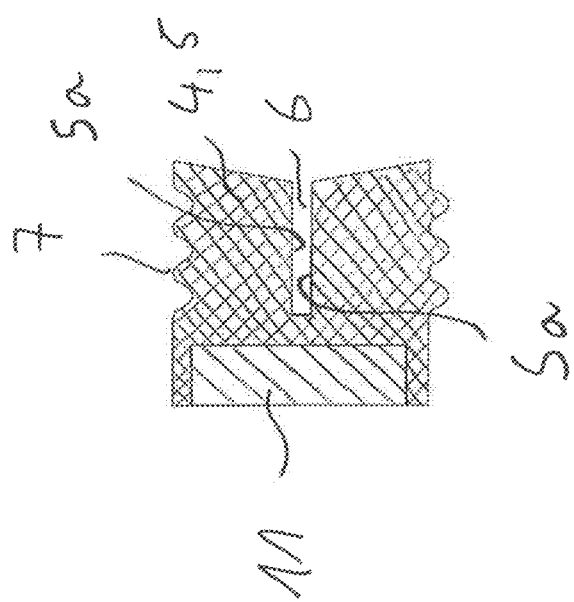
FIG. 10 is a sectional view of a profile having an inserted rod which may consist of metal, a thermoplastics, or a second elastomer having a different Shore hardness from the first elastomer, the profile making it possible to lead the primary flow of forces past a groove during compression, and the rigid rear wall of said profile being able to be used as part of a housing.

FIG. 10 is a sectional view of a profile having an inserted rod 11, which consists of metal, a thermoplastics, or a second elastomer having a different Shore hardness from the first elastomer.

Figure 11:
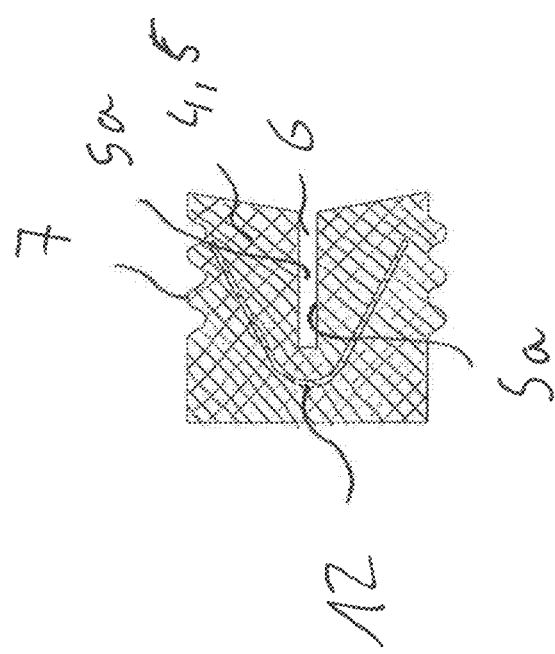
FIG. 11 is a sectional view of a profile comprising a spring plate, reinforcing the profile but still making good compression possible.

FIG. 11 is a sectional view of a profile having a spring plate 12, ensuring rigidification of the profile but still making good compression possible.

Figure 12:
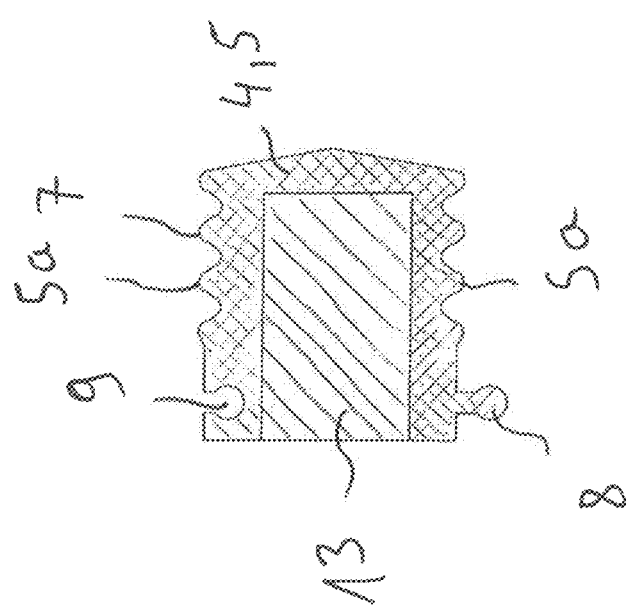
FIG. 12 is a sectional view of a profile having a hard core which may consist of metal, a thermoplastics, or a second elastomer having a different Shore hardness from the first elastomer, making a soft connection possible but still providing a rigid profile, and the rigid rear wall of said profile being able to be used as part of a housing.

FIG. 12 is a sectional view of a profile having a hard core 13, which may consist of metal, a thermoplastics, or a second elastomer having a different Shore hardness from the first elastomer.

Figure 13:
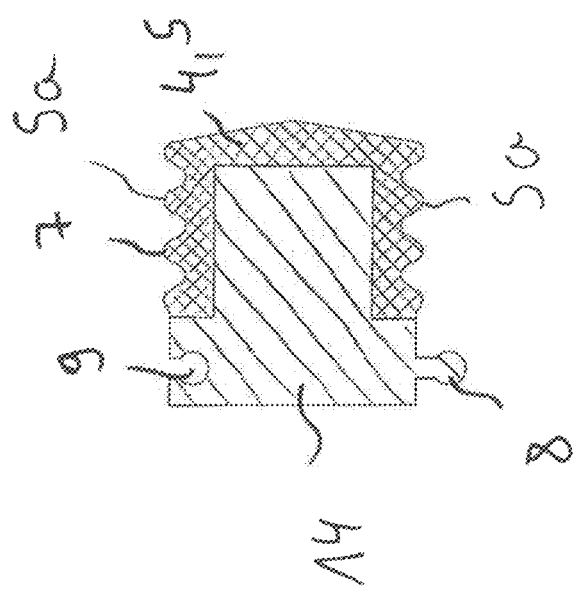
FIG. 13 is a sectional view of a profile which is configured as a two-component part, making possible a soft connection of an inherently rigid profile which can also be connected well, the rigid rear wall of said profile being able to be used as part of a housing.

FIG. 13 is a sectional view of a profile which is configured as a two-component part. The more rigid rear wall 14 thereof comprises a claw element 8 and a claw element receiver 9.

A hard profile of this type may rest on one side of a sealing seam 2 whilst a soft profile rests on the other side. This is particularly expedient if the hard profile can act as an additional resting support, specifically if it is placed below a pouch cell.

Figure 14:
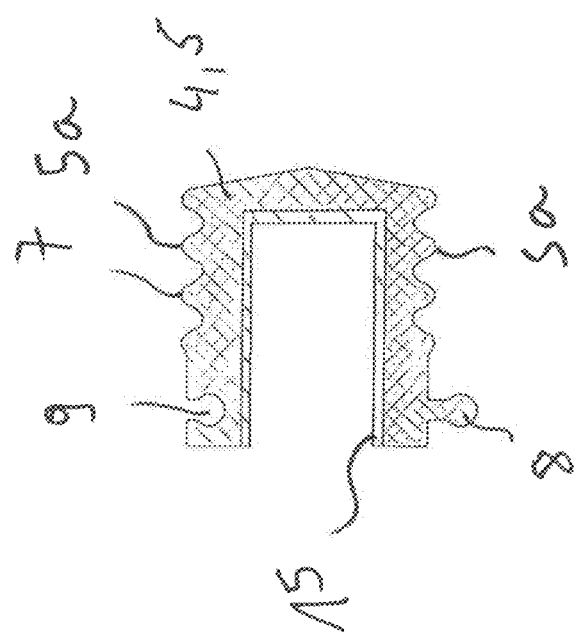
FIG. 14 is a sectional view of a profile having U-shaped rails, saving weight and making it possible to receive other structures and components.

FIG. 14 is a sectional view of a profile having a U-shaped rail 15, saving weight and making it possible to receive other structures and components.

Figure 15:
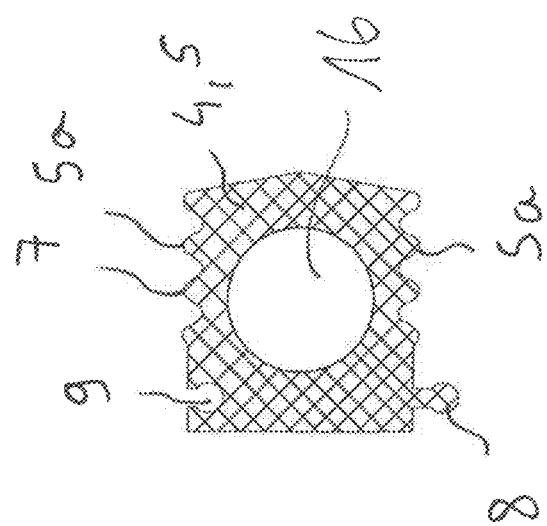
FIG. 15 is a sectional view of a profile having a hollow chamber, making it possible to save weight, to save material and to reduce costs, and also making a soft connection of the profile possible.

FIG. 15 is a sectional view of a profile having a sealed-off hollow chamber 16.

Figure 16:
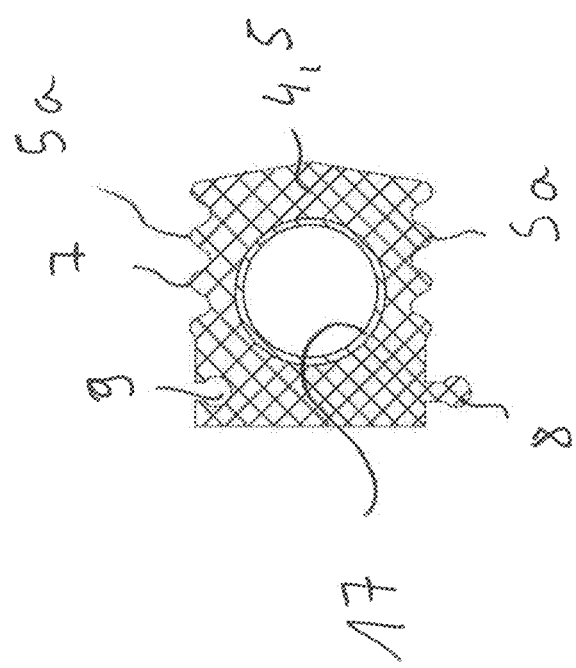
FIG. 16 is a sectional view of a profile comprising a tube for integrating for example a cooling system into the profile.

FIG. 16 is a sectional view of a profile having a tube 17. This tube 17 may for example be configured as a cooling tube in order to integrate a cooling system into the profile.

Figure 17:
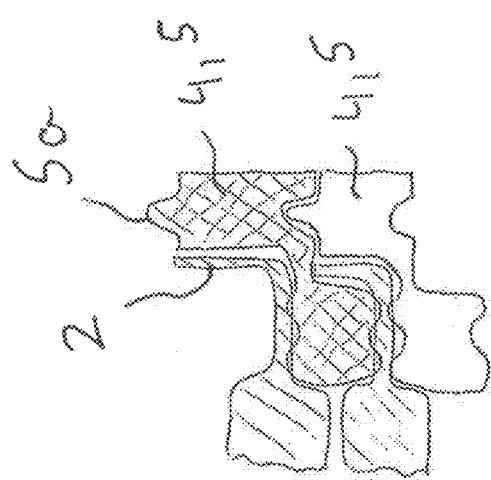
FIG. 17 is a sectional view of a profile having a Z-shaped cross section, it being possible to use lateral construction space for the pouch cell by folding up a lateral sealing seam without having to reduce the width of the sealing seam, making it possible to achieve improved use of space.

FIG. 17 is a sectional view of a profile having a Z-shaped cross section, it being possible to use lateral construction space for the pouch cell by folding up a lateral sealing seam 2 without having to reduce the width of the sealing seam 2. The aforementioned means for rigidifying the profile are conceivable in this profile too.

Figure 18:
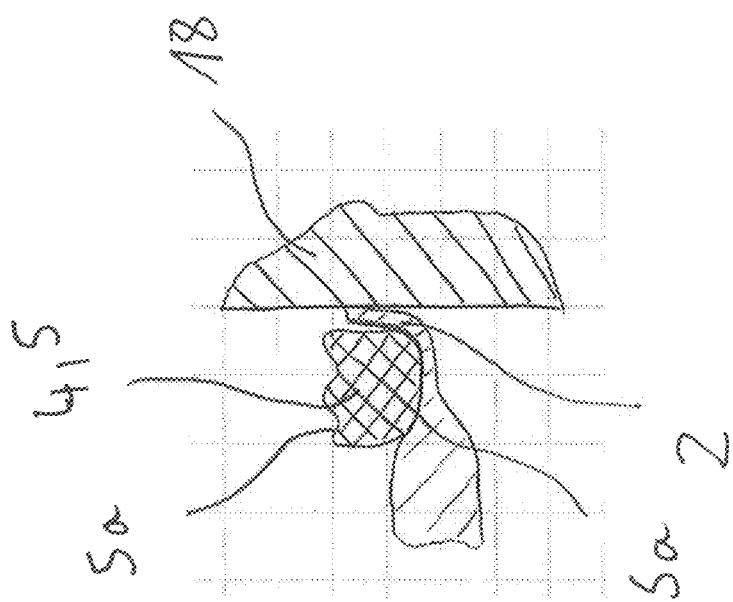
FIG. 18 is a sectional view of a profile having a Z-shaped cross section which can be used as a counter element when a housing wall is used, it being possible to use lateral construction space for a pouch cell by folding up a lateral sealing seam without having to reduce the width of the sealing seam, making it possible to achieve improved use of space, space again being saved if the housing is used as a counter face, and it additionally being possible to bring about direct cooling of the pouch cells, in particular if a cooled housing wall consists of metal or a highly thermally conductive material.

FIG. 18 is a sectional view of a profile having a Z-shaped cross section which can be used as a counter element when a housing wall 18 is used, it being possible to use lateral construction space for a pouch cell by folding up a lateral sealing seam 2. Space is saved if the housing wall 18 is used as a counter face, and it is possible to bring about direct cooling of the pouch cells, in particular if a cooled housing wall 18 consists of metal or a highly thermally conductive material.

Figure 19:
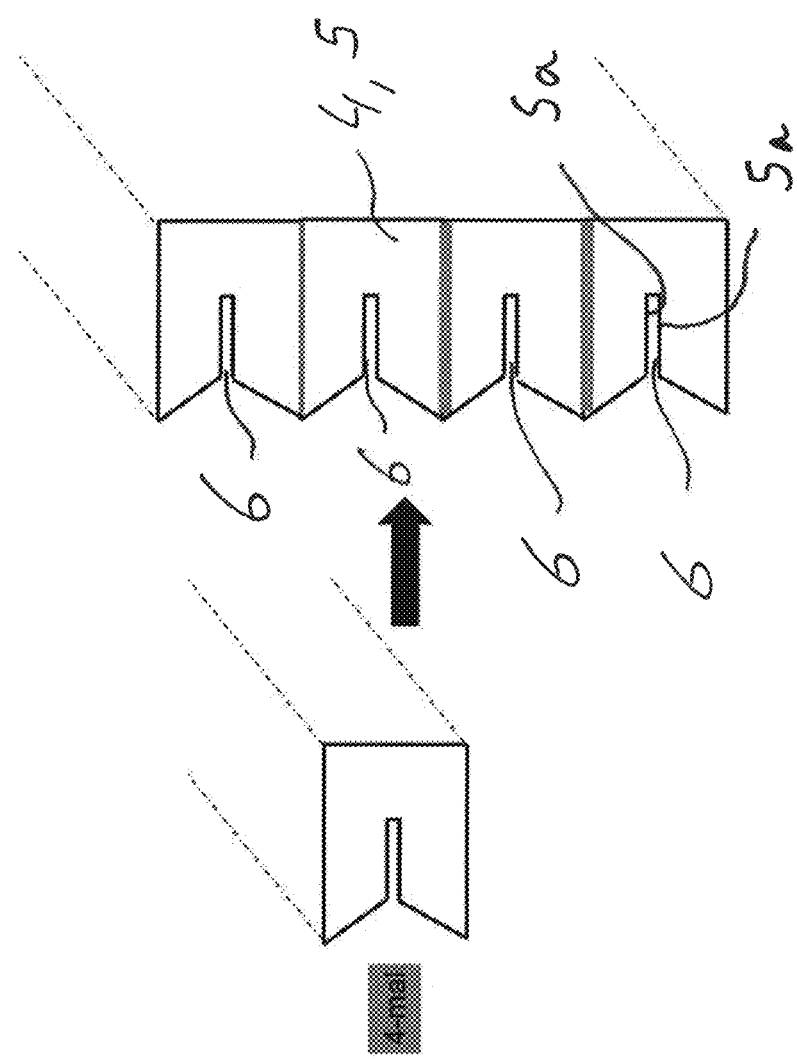
FIG. 19 is a schematic view showing that individual profiles can be combined into a comb-like profile which comprises recesses for the sealing seams of individual pouch cells, subsequent assembly of individual profiles into a stack being unnecessary because the profile is configured in the manner of a comb, and the recess which encloses a sealing seam additionally being able to be equipped with longitudinal nubs on one or both sides in the profile in order to achieve targeted compression on the sealing seam.

FIG. 19 shows a receiving element 4 of which the profile is formed in the manner of a comb, specifically having a plurality of recesses 6 for receiving sealing seams 2 of a plurality of pouch cells.

Figure 20:
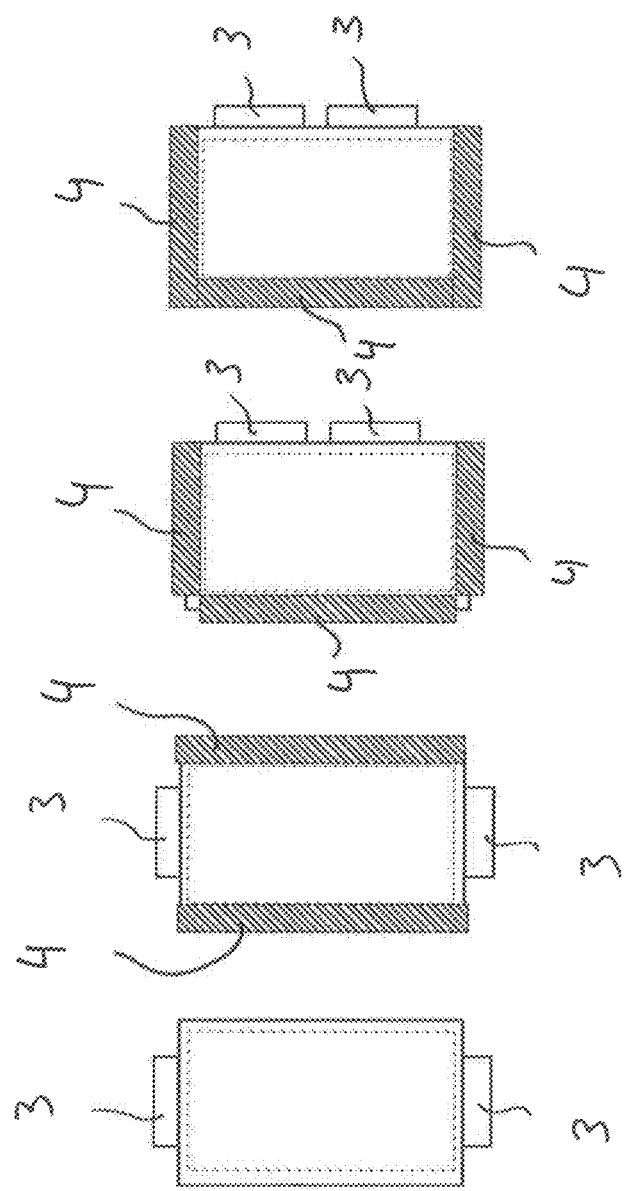
FIG. 20 is a schematic view of fixing designs for pouch cells.

FIG. 20 shows, from left to right: a pouch cell without receiving elements 4; a pouch cell having opposing current diverters 3, receiving elements 4 being located on the sides which do not comprise current diverters 3; a pouch cell having current diverters 3 positioned on only one side, the receiving elements 4 being located on the remaining three sides, the corners of the pouch cell being recessed in this case, making rapid and simple mounting possible; and a pouch cell having current diverters 3 positioned on only one side, the receiving elements 4 being located on the three remaining sides. In the three arrangements shown on the right-hand side, the profiles compress the sealing seam 2 of the pouch cells resiliently at least on one side.

In the right-hand arrangement, the corners are each covered by a profile. This has the advantage of increased mechanical protection and reduced permeation of gases or liquids in these regions. In this context, it is conceivable to place the profiles against one another as shown. It is also conceivable to apply a miter cut and to thus place the profiles at a 45° angle or at another angle to one another, which angle is predetermined by the geometry of the pouch cell. The seam present between the profiles may optionally be sealed using an adhesive, and this can particularly reduce the permeation to the sealing seam 2. The lateral, outwardly open region may optionally be sealed off using an adhesive, and this can particularly reduce the permeation to the sealing seam 2.

Against this background, the sealing seam 2 may be placed between two profiles in a simple manner.

If a profile which receives the sealing seam 2 is used, a similar construction can be implemented by introducing notches or cuts through the profile.

Figure 21:
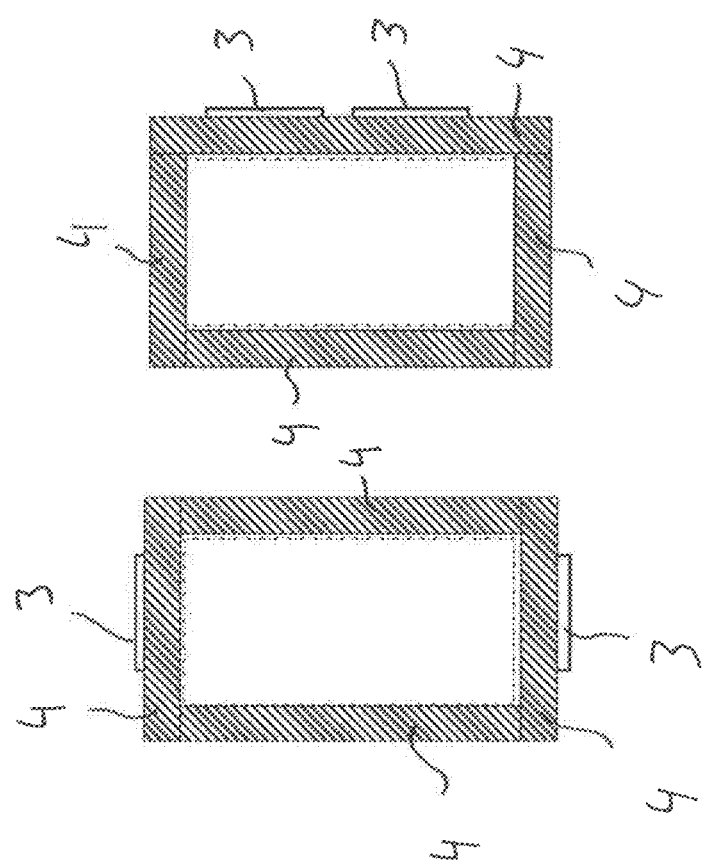
FIG. 21 is a schematic view of approaches in which the profiles also cover the bushings of the current diverters.

FIG. 21 is a schematic view of approaches in which the profiles also cover the bushings of the current diverters 3. If a profile which receives the sealing seam 2 is used, by introducing notches or cuts in the region of the current diverter 3 a construction can be achieved which makes it possible for the current diverters 3 to project through the profile. FIG. 21 shows that regions of current diverters 3 are also compressed by profiles.

Figure 22:
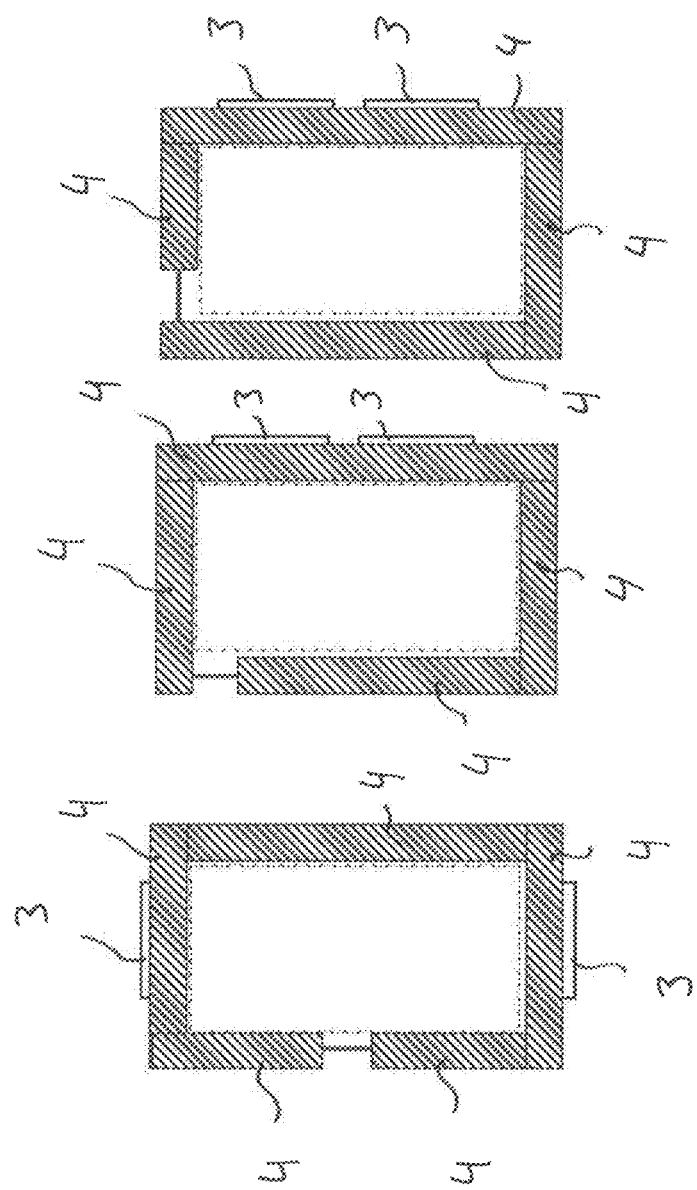
FIG. 22 is a schematic view of approaches in which the profiles also cover the bushings of the current diverters but leave a region of the sealing seam exposed.

FIG. 22 is a schematic view of approaches in which the profiles also cover the bushings of the current diverters 3, but leave a region of the sealing seam 2 exposed. An exposed region may act as a rupture disk. In the event of a damaging internal overpressure, the pouch cell opens in this region. Emitted gases, decomposition products or electrolytes can be removed in a controlled manner. They can be prevented from coming into contact with the current-carrying parts. Fires and explosions can thus be prevented.

FIG. 22 thus shows that a region of the sealing seam which is not positioned directly adjacently to current diverters 3 is not compressed by a profile, so as to form this region as a predetermined breaking point in the event of an internal overpressure.

In the arrangements shown herein, the profiles press, as parts of a stack, on sealing seams 2 on both sides, it being possible for the arrangement itself to be placed in a housing so as to have a positive fit at least in part, and the housing taking on the function of compressing the stack.

A plurality of embodiments are conceivable for assembling pouch cells equipped with frames into a stack. Fixing the stack by clamping, using tension bands, or using threaded rods or screws which reach through the profiles is conceivable. Fixing in a housing, a cover which ensures the compression being placed on after the stack is inserted, is also conceivable.

Fixing in a rack, the compression being ensured by walls of the rack, is also conceivable. The rack may be open at least in part to the front and rear, only to the rear, or only to the front. This makes it possible attach the electrical contacting or the cooling in a simple manner. Air cooling, in particular by means of fans, is possible. Fixing by means of metal clamps which enclose and clamp the profiles is also conceivable.

It is also conceivable to introduce an opening, made at the same position as recesses in the profiles, into the housing enclosing the stack. If the pouch cell opens, the emitted harmful gases can be removed safely through the opening of the housing. In this case, an elastomeric seal ensures that the majority of the gases can pass through the opening and at most only a very small part can escape along an undesired leakage path between the profile and the inner housing wall.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. An arrangement, comprising:
   at least one pouch cell, the at least one pouch cell comprising current diverters positioned on at least one side of the at least one pouch cell; and
   first and second receiving elements for mounting the at least one pouch cell,
   wherein each receiving element comprises a base body, the base body comprising a profile including a contact surface configured to contact against a sealing seam of the at least one pouch cell,
   wherein the profile is made exclusively of an elastomer or a thermoplastic elastomer,
   wherein the sealing seam of the at least one pouch cell is placed in the profile of the first or second receiving element, or between adjacent profiles of the first and second receiving elements,
   wherein at least portions of the current diverters are compressed by the profile of the first or second receiving element, or compressed between adjacent profiles of the first and second receiving elements,
   wherein the receiving elements enclose four sides of the at least one pouch cell, and wherein a region of the sealing seam which is not directly adjacent to current diverters is left exposed so as to form a predetermined breaking point in the event of an internal overpressure.

2. The arrangement of claim 1, wherein the profiles are manufactured using a continuous extrusion method.

3. The arrangement of claim 1, wherein the profiles each include a recess configured to receive the sealing seam of the at least one pouch cell.

4. The arrangement of claim 1, wherein the profiles each comprise a comb form, including a plurality of recesses configured to receive sealing seams of a plurality of pouch cells.

5. The arrangement of claim 1, wherein the profiles compress the sealing seam of the at least one pouch cell resiliently at least on one side.

6. The arrangement of claim 1, wherein the profiles compress the sealing seam of the at least one pouch cell resiliently on both sides.

7. The arrangement of claim 1, wherein the profiles press, as parts of a stack, on both sides of sealing seams,
wherein the arrangement is placed in a housing so as to have a positive fit at least in part, and
wherein the housing compresses the stack.

* * * * *